A. J. COLWELL & A. T. KENNEY.
STEERING AND TRANSMISSION MECHANISM FOR TRACTION VEHICLES.
APPLICATION FILED JUNE 24, 1915.
1,170,877.
Patented Feb. 8, 1916.
2 SHEETS—SHEET 2.
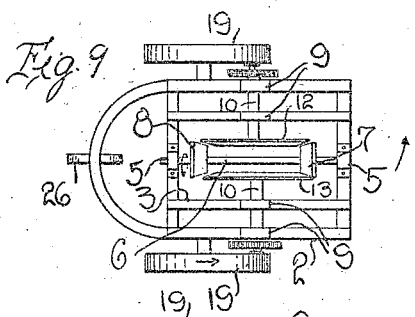
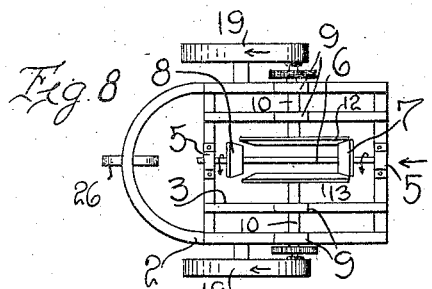
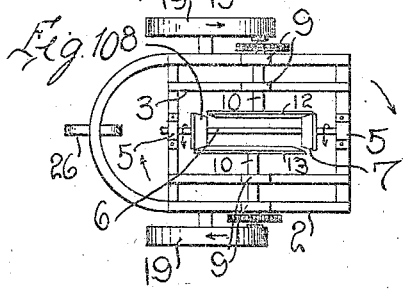
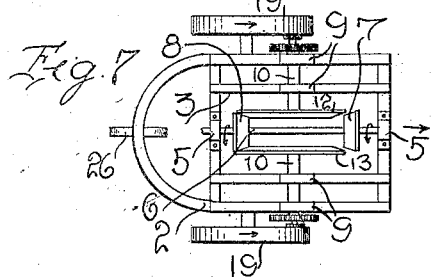
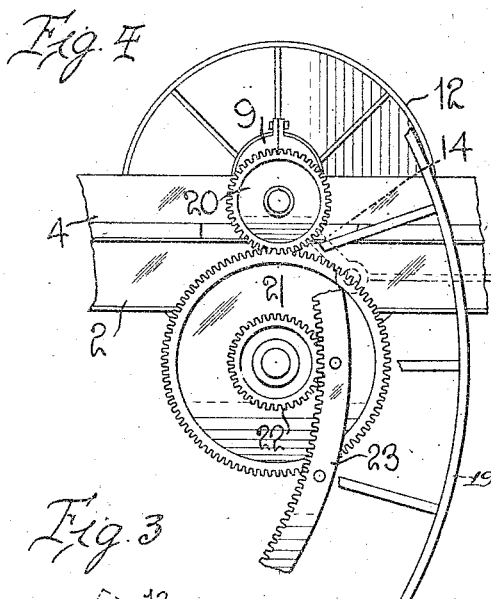
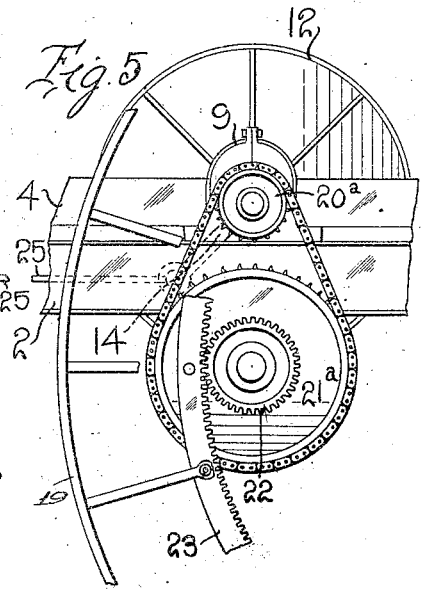
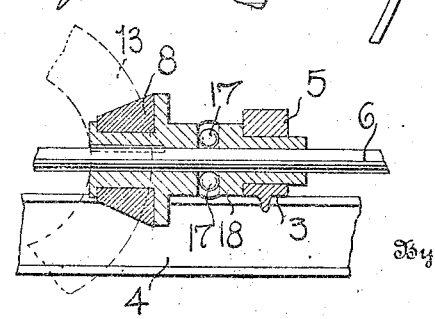
Inventors
A. J. COLWELL
A. T. KENNEY
By Watson E. Coleman
Attorney

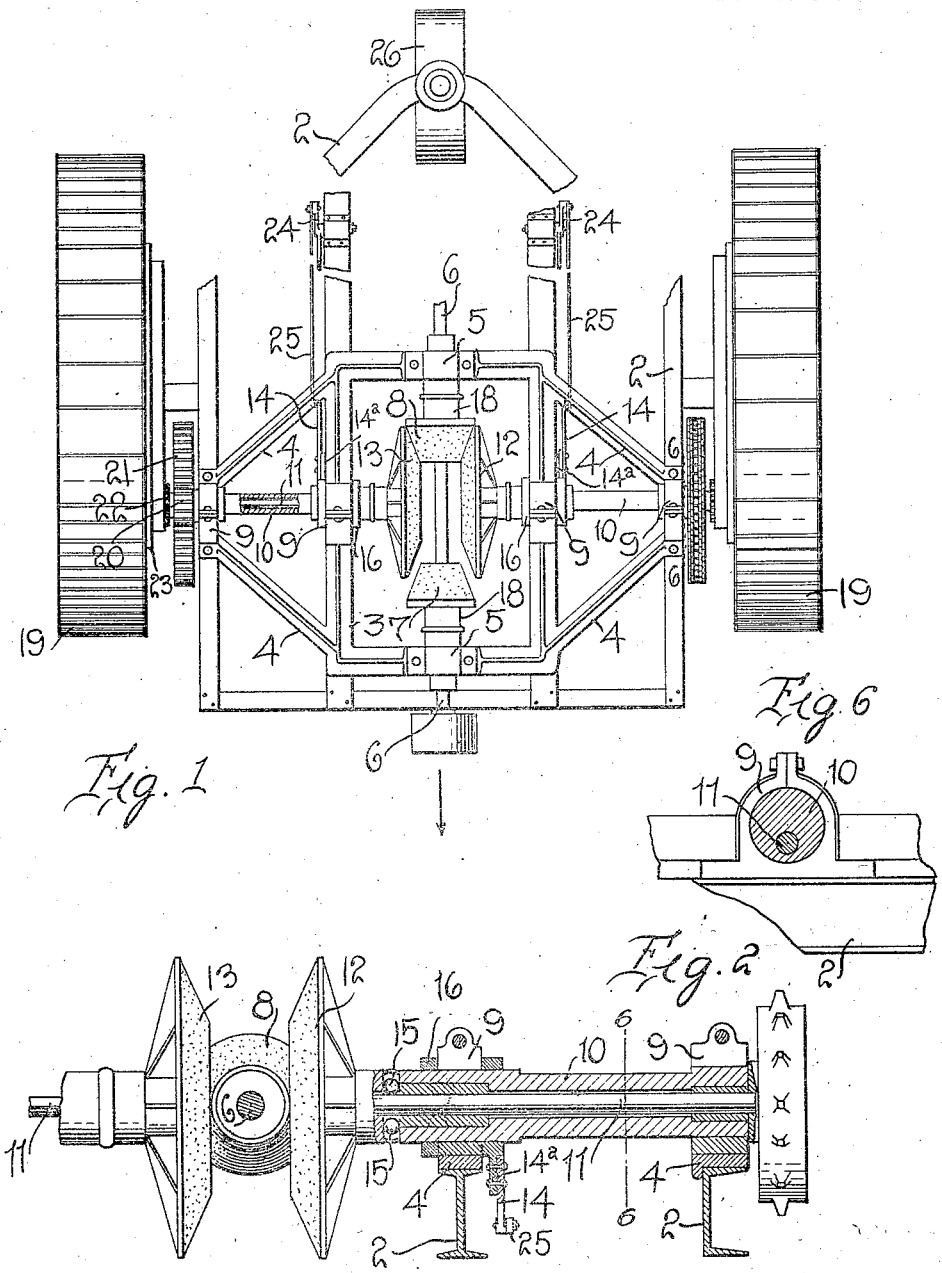

UNITED STATES PATENT OFFICE.

ALVAH J. COLWELL AND ALBERT T. KENNEY, OF NORFOLK, NEBRASKA.

STEERING AND TRANSMISSION MECHANISM FOR TRACTION-VEHICLES 1,170,877.

Specification of Letters Patent.

Patented Feb. 8, 1916.

Application filed June 24, 1915. Serial No. 36,111.

*To all whom it may concern:*

Be it known that we, ALVAH J. COLWELL and ALBERT T. KENNEY, citizens of the United States, residing at Norfolk, in the county of Madison and State of Nebraska, have invented certain new and useful Improvements in Steering and Transmission Mechanism for Traction-Vehicles, of which the following is a specification, reference being had to the accompanying drawings.

This invention relates to power transmission and steering mechanism for power propelled vehicles, and particularly to a power transmission and steering mechanism peculiarly adapted for tractors, trucks, and like vehicles.

The general object of this invention is the provision of a very simple, direct acting, and positively operating mechanism, whereby a tractor or other power propelled vehicle may be steered by the traction wheels thereof without the use of any other steering wheels or steering gear.

A further object of the invention is the provision of mechanism of this character whereby to obtain the application of power to each traction wheel independent of the application of power to the other traction wheel, and whereby to obtain independent control of the traction wheels to thus connect or disconnect them from the power or drive them either in one direction or the other.

A further object is to provide means whereby the traction wheels of a power propelled vehicle may be rotated both in the same direction to carry the machine forward, both in the same direction to carry the machine backward, either of the wheels in directions reverse to the other, or whereby either one of the wheels may be disconnected from the driving power and the other driven either forward or backward to thus cause the machine to be turned sharply in one direction or the other without the necessity of operating any other steering gear or other steering wheel.

A further object in this connection is to provide for applying power gradually to either or both of the traction wheels and for regulating the amount of power transmitted to these wheels to thus regulate to some extent the speed of the traction wheels relative to the speed of the power shaft.

A further object in this connection is to provide means whereby one of the traction wheels of the tractor may be driven at full speed, or at a less speed than full speed, and the other traction wheel may be driven at a less speed than the first-named traction wheel to thereby provide for turning the tractor upon a relatively long radius, and still another object is to provide means for permitting slippage between the driving shaft and the driven shafts connected to the traction wheels to thereby provide for a differential action between the wheels.

Still another object of the invention is to provide means for controlling the direction of rotation of the traction wheels and including steering levers movable both in one direction to drive the machine forward and both in one direction to drive the machine rearward.

Other objects has to do with improvements in the details of construction of mechanisms of this character whereby wear may be taken up and whereby the transmission may be firmly supported as will be hereafter particularly pointed out.

This invention is illustrated in the accompanying drawings, wherein:

Figure 1 is a top plan view of the combined steering and power transmission mechanism, the frame of the vehicle being partly shown; Fig. 2 is a partly sectional view of the driven shafts, one of the driving cones and the supporting frame; Fig. 3 is a fragmentary sectional view of one of the driving shafts and its bearing; Fig. 4 is a side elevation of a portion of the frame of the machine, showing the means for connecting one of the traction wheels to its corresponding driven shaft; Fig. 5 is a like view to Fig. 4 but showing the means for connecting the other traction wheel to its driven shaft; Fig. 6 is a section on the line 6—6 of Fig. 2; Fig. 7 is a diagrammatic top plan view showing the position of the driving and driven friction wheels when the tractor is moving forward; Fig. 8 is a like view to Fig. 7 but showing the position of the parts when the tractor is moving backward; Fig. 9 is a like view to Figs. 7 and 8 but showing the position of the friction wheels when the vehicle is making a quick turn toward the left; Fig. 10 is a like view to Fig. 9 but showing the position of the friction wheels when the tractor is being turned end for end.

Referring to these drawings, 2 designates generally the frame of a tractor which supports upon it an approximately rectangular transmission supporting frame 3, this frame 3 having integral lateral extensions 4. Supported upon the front and rear bars of the frame 3, or in any other suitable manner, are bearings 5 whose detail construction will be later described, and supported in these bearings is a power shaft 6 adapted to be driven by any suitable power, such as an internal combustion engine. Keyed or otherwise mounted upon the driving shaft 6 for rotation therewith are the oppositely disposed friction wheels 7 and 8. These friction wheels are preferably made of tarred fiber or like material and have the form of truncated cones, the smaller ends of the cones facing toward each other.

Mounted in bearings 9 upon the side bars of the frame 3 and upon the extensions 4 of this frame 3 are the sleeves or boxes 10. These are cylindrical and rotate in cylindrical journals formed in the bearings 9 and are eccentrically bored each for the passage of a traction wheel shaft 11. Each wheel shaft, as illustrated in Fig. 1, carries upon its inner end the bevel-faced friction wheels 12 and 13 which are adapted to coact with and have frictional engagement with the friction cones 7 and 8. The space between the faces of the driving cones 7 and 8 is greater than the diameter of either of the beveled friction wheels 12 or 13 so that when these beveled friction wheels 12 and 13 are placed in the middle position midway between the cones 7 and 8, there will be no frictional engagement between the cones and the wheels. When, however, a box or sleeve 10 is rotated in one direction, the eccentricity of the shaft 11 relative to the eccentric box or sleeve 11 cause the shaft to be moved forward or backward, depending upon the direction of rotation of the sleeve or box, and thus the active face of the corresponding friction disk or wheel 12 or 13 will be carried into frictional engagement with one or the other of the friction cones 7 or 8. For the purpose of adjustably rotating the sleeves 10 independently of each other, I mount upon each sleeve the radially projecting arm 14. As illustrated, each arm is clamped in place upon a radially projecting lug formed upon a clamping ring 14ª which is clamped upon the corresponding sleeve or box 10.

Each friction wheel 12 or 13 is keyed or otherwise mounted upon the corresponding shaft 11, but has longitudinal movement relative to the shaft and is held to its work by means of a thrust bearing comprising the anti-friction members 15 and adjustable collars or nuts 16. The anti-friction balls 15 form thrust bearings while the adjustable collars being mounted upon the sleeves or eccentric boxes 10, permit the sleeves to be shifted longitudinally of the bearings to thus cause the sleeves to press with greater or less force upon the friction balls and thus adjust the friction wheels with relation to the friction cones. The friction cones 7 and 8 are also keyed upon the shaft 6 and the thrust of these cones is supported by ball bearings 17 bearing against thrust collars 18, these collars being adjustable so as to take up wear, increase or decrease frictional contact between the transmission wheels, and increase or decrease the space between the friction collars 7 and 8.

While we do not wish to be limited to any particular manner of gearing the traction wheels 19 to the shafts 11, we have illustrated one shaft 11 as provided with a pinion 20 meshing directly with a toothed gear wheel 21 whose shaft carries a pinion 22 in turn meshing with an internal gear wheel 23 mounted upon the traction wheel. The other shaft is provided with a sprocket wheel 20ª operatively engaged by means of a sprocket chain with a sprocket wheel 21ª which in turn carries the gear wheel 22 meshing with a gear 23. By this construction we provide that a movement in one direction of both of the levers 14 will cause the machine to move forward, while a movement in the other direction of both controlling levers will cause the machine to move rearward. Thus no confusion can exist with regard to the movement of these levers and the steering is rendered natural.

While we might use the arms or levers 14 as the sole means for shifting the sleeves 10, we preferably, however, connect the arms 14 to controlling levers 24 which are pivotally supported in any suitable manner, as upon the middle beams of the frame 2, these controlling levers 24 being connected by means of links or connecting rods 25 to the levers or arms 14. By this means the steering of the machine is accomplished from the rear end thereof upon which the driver is supported in any suitable manner. Preferably the rear end of the machine is supported by means of a supporting wheel 26 suitably mounted upon the frame of the tractor, said wheel acting as a trailer, if desired.

The operation of the transmission mechanism above described will be evident to those skilled in the art. When it is desired to drive the machine forward, as illustrated in Fig. 7, the friction wheels 12 and 13 are both shifted by a proper operation of the corresponding levers 24 so as to carry both friction wheels into contact with the driving cone 8. Both of the traction wheels will now be rotated in the same direction and at a corresponding speed by reason of the fact that one traction wheel is connected to its driven shaft by means of a sprocket chain and sprocket wheels, as in Fig. 5, while the other traction wheel is connected to its shaft through the gears 20 and 21 thus causing this traction wheel to rotate in a reverse direction to the direction of rotation of the corresponding shaft 11.

If it is desired to reverse the movement of the tractor so that it will move backward instead of forward, the friction wheels 12 and 13 are both shifted into engagement with the cone 7, as shown in Fig. 8.

If it be desired that the machine shall turn sharply or quickly to the left, then, as illustrated in Fig. 9, the friction wheel 13 is shifted into engagement with the cone 7 while the friction wheel 12 is shifted out of engagement with either of the cones 7 and 8 and into a neutral position. Under these circumstances the traction wheel connected to the beveled gear 12 will act as a pivot upon which the machine will turn, and as a consequence the machine will turn sharply toward the right. Where it is desired that the machine shall make a relatively wide turn, as for instance a turn toward the left, the friction wheel 13 is shifted into engagement with the cone 7 and the gear 12 is also shifted into engagement with the cone 7 but only lightly engaged therewith and with a much lighter pressure than the opposite friction wheel so that there will be slippage. Thus one shaft will be driven at a higher rate of speed than the other shaft and the machine will make a relatively wide turn, or a turn of great radius. If it be desired, as in Fig. 10, that the machine shall be turned end for end without moving out of its tracks, then the friction wheel 12 is shifted into engagement with one of the cones while the friction wheel 13 is shifted into engagement with the other cone. Thus the shafts will be caused to rotate in opposite directions and the traction wheels will rotate in opposite directions.

Of course what applies to the turning of the machine to the left will equally well apply to the turning of the machine toward the right. It is also obvious that the machine may be backed and steered in precisely the same manner as heretofore described for moving the machine forward and simultaneously steering it, and in fine, that the machine is at all times entirely within the control of the operator for a steering movement. It will also be obvious that both of the friction wheels 12 and 13 may be shifted out of engagement with the cones 7 and 8 and thus the machine remain stationary though the engine is being operated. The slippage which may be provided for between either one of the friction wheels 12 and 13 and the friction cones 7 and 8 permits a differential action of the traction wheels, that is, allows the two wheels driven by one source of power to revolve at different speeds. Thus it has been found in experience with our tractor that in plowing the traction wheel on the unplowed land will lead ahead of the traction wheel that runs in the furrow. This is due to the soft ground in the furrow offering less resistance to the wheel. By running the friction wheel looser on the land side than on the furrow side we can counteract this slippage and hold the machine true in the furrow.

The reason for using the mode of transmitting the power of the shafts 11 to the traction wheels as illustrated in Figs. 4 and 5 is that this form of transmission mechanism is very simple and permits of a relatively great range of movement of the shaft and the eccentric box without throwing the parts out of gear.

While friction wheels or gears have been shown and are much more effective in practice for the reason that thereby a gradual application of power may be secured, and also because it is possible to operate one shaft at a lower rate of speed than the other shaft 11, and further because the use of conical friction wheels permits wear to be taken up, yet this invention is not limited to the use of friction wheels as it is obvious that bevel gear wheels may be employed in place of friction wheels. Neither is this invention limited to the use of sleeves for the purpose of shifting the eccentric shafts 11 to carry the corresponding wheels 12 and 13 into engagement with one or the other of the driving cones, as other means may be provided for shifting these shafts without departing from the spirit of the invention. However, the sleeves or boxes give a relatively long and firm support for the shafts 11 and further provide a very simple means, cheaply made and easily operated, whereby the shafts may be shifted. Of course means may be provided in the form of sector racks for holding the levers 14 in their adjusted position.

The system of friction wheels, shaft boxes, and other parts heretofore described, makes possible a transmission whereby clutches, reverse gears and differential gears are dispensed with, thus greatly reducing the cost of manufacture and simplifying the operation of the tractor. The construction gives control of either driving wheel independent of the other and in a manner not obtainable otherwise except with relatively complicated mechanisms.

It will be obvious that this invention may be applied to all forms of power trucks, tractors, commercial cars, or to traction driven farm machinery, and anywhere where it is necessary to apply power to either one of two driving wheels separately or both at the same time.

While under some circumstances the wheel 26 may be connected to means for positively turning it so as to hold the machine steady, yet when the machine is used as a tractor in pulling wagons, rakes, harrows, etc., or driving on the road or through fields, the steering is secured entirely through the control of the traction wheels. Under all circumstances, however, the wheel 26 is merely used as an auxiliary in certain classes of work.

Having thus described the invention, what is claimed is:

1. In a motor vehicle, steering and power transmission mechanism, including a power shaft, independently movable traction wheels, a shaft operatively connected to each traction wheel, oppositely disposed driving wheels mounted on the power shaft, oppositely disposed driven wheels mounted one on each traction wheel shaft and disposed between said driving wheels, and means for operatively engaging both of the driven wheels with either of the driving wheels.

2. In a motor vehicle, steering and power transmission mechanism, including a power shaft, traction wheels, independently rotatable shafts to which the traction wheels are operatively connected, oppositely disposed driving wheels mounted on the power shaft, oppositely disposed driven wheels mounted one on each traction wheel shaft, said driven wheels being mounted between the driving wheels, and means for operatively engaging one of the driven wheels with one of the driving wheels, and the other driven wheel with the other driving wheel.

3. In a motor vehicle, steering and power transmission mechanism, including a power shaft, traction wheels, independently movable shafts to which the traction wheels are operatively connected, oppositely disposed driving wheels mounted on the power shaft, oppositely disposed driven wheels mounted one on each traction wheel shaft and located between the driving wheels, and means for operatively disconnecting either one of the driven wheels from both driving wheels, and connecting the other one of the driven wheels to either one of the driving wheels.

4. In a motor vehicle, steering and power transmission mechanism, including a power shaft, traction wheels, independently rotatable driven shafts, gear wheel connection between one of said shafts and one traction wheel, sprocket wheel and chain connection between the other driven shaft and the other traction wheel, oppositely disposed driving wheels mounted on the power shaft, oppositely disposed driven wheels mounted one on each traction wheel shaft, and means for operatively engaging both of the driven wheels with either of the driving wheels or one of the driven wheels to one of the driving wheels, and the other driven wheel to the other driving wheel, or disconnecting one of the driven wheels from both driving wheels and connecting either one of the driven wheels to either one of the driving wheels.

5. In a motor vehicle, steering and power transmission mechanism, including a power shaft, independently rotatable driven shafts, traction wheels operatively connected to the respective shafts, oppositely disposed driving wheels mounted on the power shaft, oppositely disposed driven wheels mounted one on each traction wheel shaft, bearings in which the traction wheel shafts are eccentrically mounted, and independent means for rotating said bearings in the same or opposite directions, as and for the purpose set forth.

6. In a motor vehicle, a supporting frame, a power shaft mounted upon the frame and extending longitudinally thereof, oppositely disposed spaced conical driving friction wheels mounted upon and rotatable with the power shaft, laterally extending alining driven shafts mounted upon the frame, traction wheels operatively engaged by said shafts, oppositely disposed conical friction driven wheels mounted each upon one of said driven shafts and disposed between the driving friction wheels, independent means for shifting each of the driven friction wheels and the inner end of the corresponding shaft longitudinally parallel to the power shaft from a neutral position into engagement with either one of the driving friction wheels, said means comprising eccentrically bored elements rotatably mounted upon the supporting frame, and means for rotating said elements.

7. In a motor vehicle, a steering and power transmission mechanism including a power shaft, traction wheels, a shaft operatively connected to each traction wheel, oppositely disposed driving wheels mounted on the power shaft, oppositely disposed driven wheels mounted one on each traction wheel shaft, and means for operatively engaging both of the driven wheels with either of the driving wheels or one of the driven wheels to one of the driving wheels and the other driven wheel to the other driving wheel, or disconnecting one of the driven wheels from both driving wheels and connecting either one of the driven wheels to either one of the driving wheels.

8. In a motor vehicle, a supporting frame, a power shaft mounted on the frame and extending longitudinally thereof, oppositely disposed spaced conical driving friction wheels mounted upon and rotatable with the driving shaft, laterally extending alining driven shafts mounted upon the frame, oppositely disposed conical friction driven wheels mounted upon each of said driven shafts and disposed between the driving friction wheels, means for independently shifting each of the driven friction wheels from a neutral position into engagement with either one of the driving friction wheels, traction wheels mounted upon the supporting frame, gear wheels mounted upon the traction wheels, a pinion meshing with one of said gear wheels, a gear wheel mounted upon the shaft of said pinion, a pinion carried upon a corresponding driven shaft and engaging the last named gear wheel, a pinion engaging the gear wheel of the opposite traction wheel, a sprocket wheel carried upon the shaft of said pinion, a sprocket wheel carried upon the shaft of said corresponding driven shaft, and a sprocket chain connecting said sprocket wheels.

In testimony whereof we hereunto affix our signatures in the presence of two witnesses.

ALVAH J. COLWELL.
ALBERT T. KENNEY.

Witnesses:
 BURT MAPES,
 W. R. McFARLAND.